United States Patent [19]
Chiba et al.

[11] Patent Number: 4,883,950
[45] Date of Patent: Nov. 28, 1989

[54] COMPOSITE MAGNETIC AND OPTICAL HEAD

[75] Inventors: Kazuo Chiba; Yoshiaki Ohishi, both of Ichihara; Jituo Migita, Sakai; Hajime Mochizuki; Takao Kobayashi, both of Yokohama, all of Japan

[73] Assignee: The Furukawa Electric Co., Ltd., Tokyo, Japan

[21] Appl. No.: 159,041

[22] Filed: Feb. 22, 1988

[30] Foreign Application Priority Data

May 23, 1987 [JP] Japan .................. 62-126522
May 23, 1987 [JP] Japan .................. 62-126525

[51] Int. Cl.⁴ .................. G06K 7/01; G11B 13/04
[52] U.S. Cl. .................. 235/440; 235/439; 235/449; 235/473; 360/121; 360/129; 369/14
[58] Field of Search ........... 235/439, 440, 449, 454, 235/473; 369/14; 360/121–122, 124–125, 128–129, 114; 250/566–569

[56] References Cited

U.S. PATENT DOCUMENTS

| | | | |
|---|---|---|---|
| 3,612,835 | 10/1971 | Andrews | 235/440 |
| 3,781,834 | 12/1973 | Van Ginkel et al. | 360/124 |
| 4,029,944 | 6/1977 | Trenkamp | 235/440 |
| 4,041,279 | 8/1977 | Foote | 235/440 |
| 4,056,712 | 11/1977 | Trenkamp et al. | 235/449 |
| 4,085,430 | 4/1978 | Gerkena et al. | 360/121 |
| 4,405,959 | 9/1983 | Chabrolle | 360/121 |
| 4,574,190 | 3/1986 | Nishimura | 235/449 |
| 4,719,527 | 1/1988 | Yoshisato et al. | 360/121 |

FOREIGN PATENT DOCUMENTS 61125763 8/1986 Japan .

Primary Examiner—Aristotelis M. Psitos
Assistant Examiner—Robert A. Weinhardt
Attorney, Agent, or Firm—Frishauf, Holtz, Goodman & Woodward

[57] ABSTRACT

A composite magnetic and optical head comprises a magnetic sensor including a magnetic core which is adapted to detect a magnetic pattern recorded on a record medium; an optical sensor including a nonmagnetic light transmitting member located along a distal gap of the magnetic sensor and an optical fiber bundle having one end connected to the light transmitting member, and adapted to detect an optical pattern recorded on the record medium; and a holder containing the magnetic and optical sensors in the internal space thereof, the holder having two opposite side walls extending at right angles to the distal gap of the magnetic core and one end face from which the distal gap projects outward. The magnetic core of the head includes a wide portion, situated close to the distal gap and projecting outward from the one end face of the holder, and a narrow portion surrounded by the holder so as to be located inside the one end face, the wide portion being at least wider than the distance between the opposite side walls. If a plurality of such composite heads are arranged side by side to form a multihead, the respective distal gaps of the adjacent cores can be arranged intimately in contact with one another without being hindered by the holders of the heads. Thus, the medium identifying accuracy of the head is improved.

17 Claims, 22 Drawing Sheets

← UV RADIATION

COMPOSITE MAGNETIC AND OPTICAL HEAD

BACKGROUND OF THE INVENTION

The present invention relates to a composite magnetic and optical head capable of simultaneously reading magnetic and optical patterns recorded on a record medium, such as paper money.

The inventor hereof proposed such a composite head which can simultaneously detect a magnetic pattern and an optical pattern recorded on the same position on a record medium, such as paper money (Japanese Utility Model Disclosure No. 61-125763). In this composite head, a light transmitting member (optical member) formed of a light transmitting nonmagnetic material is attached to a magnetic detector gap (distal gap) of a magnetic sensor, which is formed by winding coils on magnetic cores. An optical fiber bundle, used to read optical data, is connected to the optical member, and the magnetic sensor is covered with a bisected holder for holding and fixing the same.

Magnetic and optical patterns are simultaneously put on the surface of paper money or other record medium by using printing ink mixed with magnetic powder. As the record medium is moved in intimate contact with the gap of the composite magnetic and optical head, the head reads the magnetic pattern by detecting the time-based change of the induced current or impedance of the coils on the magnetic cores. At the same time, a light from a light emitting element is guided to a transparent optical member through an optical fiber bundle for incidence, and is reflected by the record medium. The reflected light is guided to a light sensing element through an optical fiber bundle for reflection. Thus, the optical pattern is read.

The record medium is identified by means of a multihead which is composed of a plurality of composite magnetic and optical heads arranged in a row. In order to improve the identification accuracy of the multihead, the individual composite heads must be minimized in size, and the gaps between the adjacent heads must be narrowed.

In the prior art composite magnetic and optical head, however, a number of optical fiber bundles, magnetic terminals, etc., are arranged mixedly and complicatedly within a narrow space in the holder. Thus, the assembling work requires much time and labor. At the time of a soldering operation, moreover, a soldering iron may touch the optical fibers or the like, thereby damaging or cutting off the same. Conventionally, therefore, it is hard to miniaturize the composite head.

SUMMARY OF THE INVENTION

The primary object of the present invention is to provide composite magnetic and optical head usable in multihead arrangement and improved in medium identification accuracy.

Another object of the invention is to provide such a composite head small-in-size and easy to manufacture.

Still another object of the invention is to provide such a composite head capable of being easily mounted on a substrate or the like.

According to the present invention, there is provided a composite magnetic and optical head, which comprises a magnetic sensor including a magnetic core means and adapted to detect a magnetic pattern recorded on a record medium; an optical sensor including a nonmagnetic light transmitting member located along a distal gap of the magnetic sensor and an optical fiber bundle having one end connected to the light transmitting member, and adapted to detect an optical pattern recorded on the record medium; and a holder containing the magnetic and optical sensors in the internal space thereof, the holder having two opposite side walls extending at right angles to the distal gap of the magnetic core means and one end face from which the distal gap projects outward.

The magnetic core means of the composite head of the present invention includes a wide portion, situated close to the distal gap and projecting outward from the one end face of the holder, and a narrow portion surrounded by the holder so as to be located inside the one end face, the wide portion being at least wider than the distance between the opposite side walls. If a plurality of such composite heads are arranged side by side to form a multihead, the distal gaps of each two adjacent magnetic core assemblies can be located in intimate contact with one another, without being hindered by their corresponding holders. Thus, the medium identification accuracy is improved.

Preferably, the opposite side walls of the holder are provided individually with first and second step portions so that the corresponding first and second step portions of each two adjacent holders can engage each other when a plurality of the composite heads are arranged with the distal gaps thereof situated on a straight line.

Moreover, a coating layer having a refractive index lower than that of the light transmitting member is preferably formed at least on that surface of the light transmitting member which faces the end face of the magnetic core means defining the distal gap.

Preferably, furthermore, the optical fiber bundle is previously shaped for a predetermined configuration adapted for the arrangement in the internal space of the holder, and a coating material having a refractive index lower than that of a clad layer of each of optical fibers, constituting the optical fiber bundle, is applied to the outer surface of each of the optical fibers, and is hardened so that the optical fiber bundle is shaped into the predetermined configuration.

If optical fibers constituting the optical fiber bundle are plastic optical fibers, they can be shaped into the predetermined configuration by heating.

Preferably, a light emitting element and a light sensing element are connected to the end faces of a fiber bundle for incidence and a fiber bundle for emission, respectively, and are embedded in their corresponding apertures formed in the holder lest the optical fiber bundles be drawn out of the holder.

Preferably, furthermore, the other end of the optical fiber bundle is fixed so that the other end face of the optical fiber bundle is smoothed and exposed on the other end face of the holder, and the smoothed other end face of the optical fiber bundle is opposed and optically coupled to a light emitting element or a light sensing element retained by a second holder.

The above and other objects, features, and advantages of the invention will be more apparent from the ensuing detailed description taken in connection with the accompanying drawings. cl BRIEF DESCRIPTION OF THE DRAWINGS FIG. 1 is a perspective view of a prior art composite magnetic and optical head;

Figure 19:
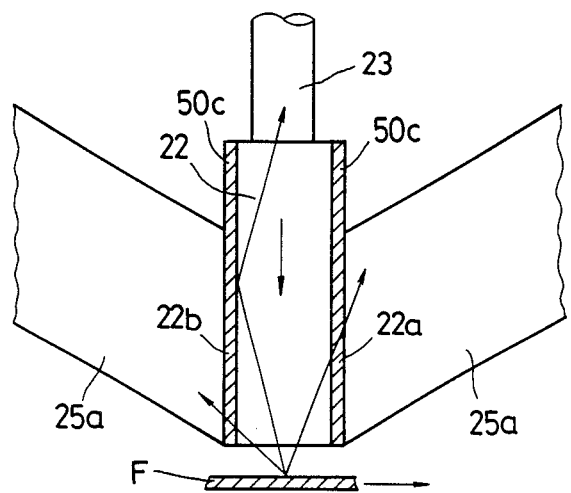
Figure 20:
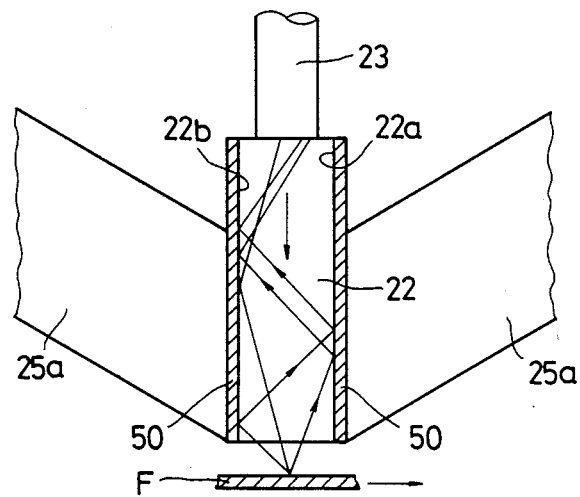
Figure 21:
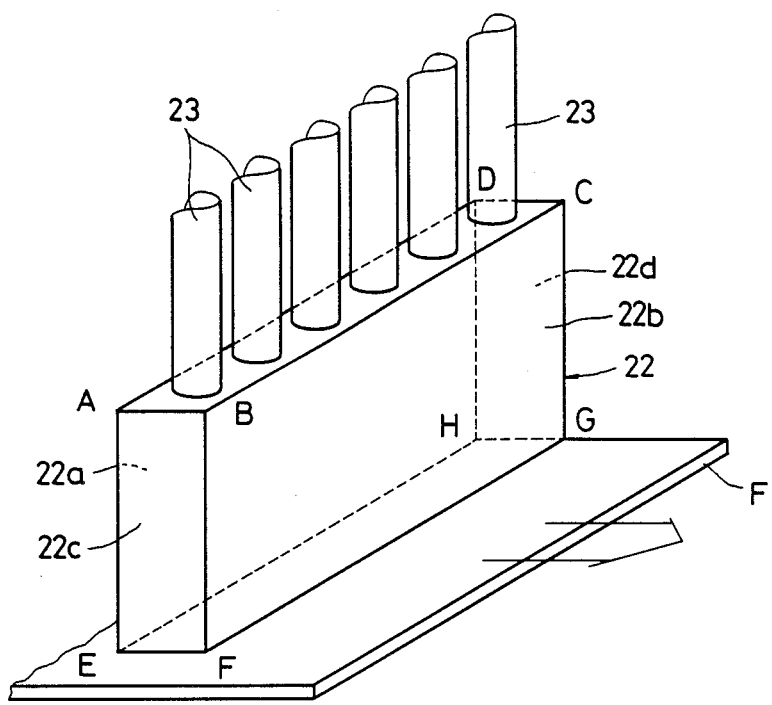
Figure 22:
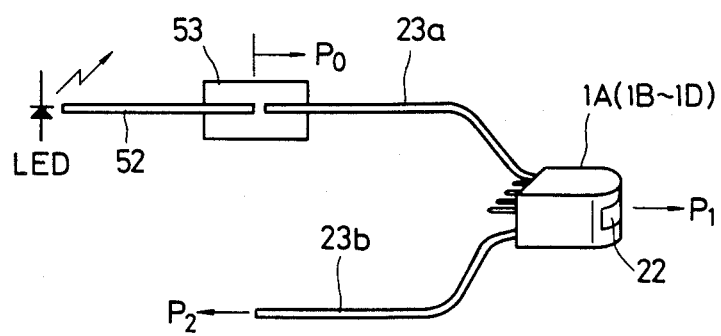
Figure 23:
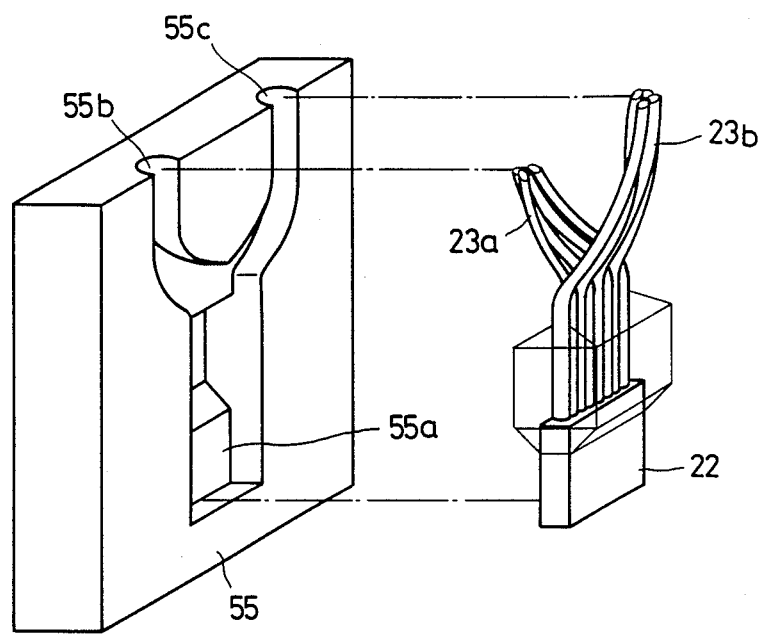
Figure 24:
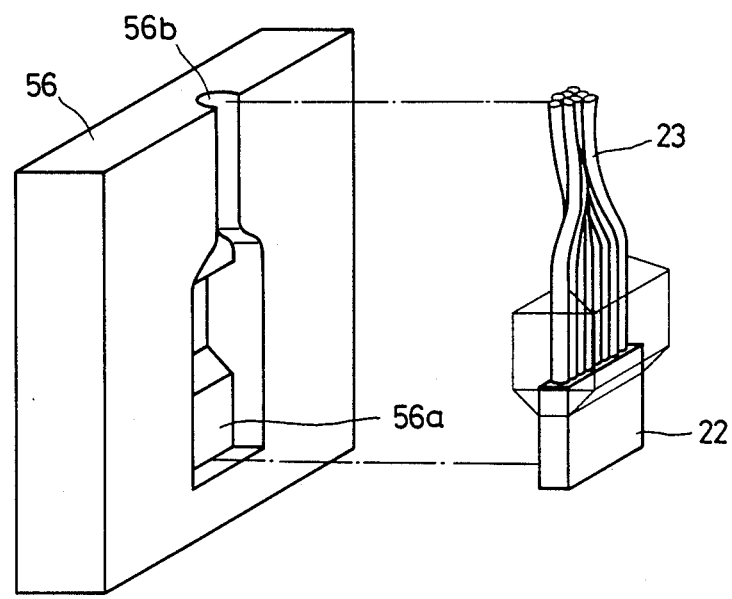
Figure 25:
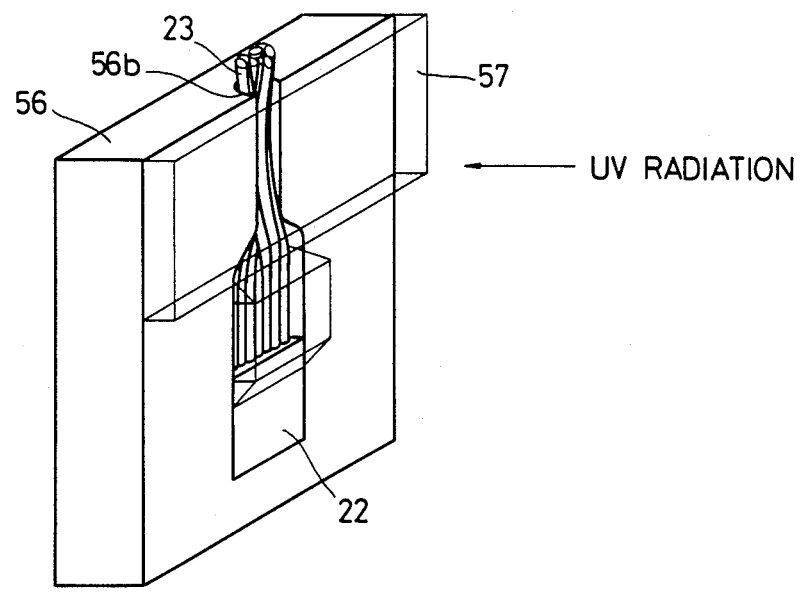
Figure 26:
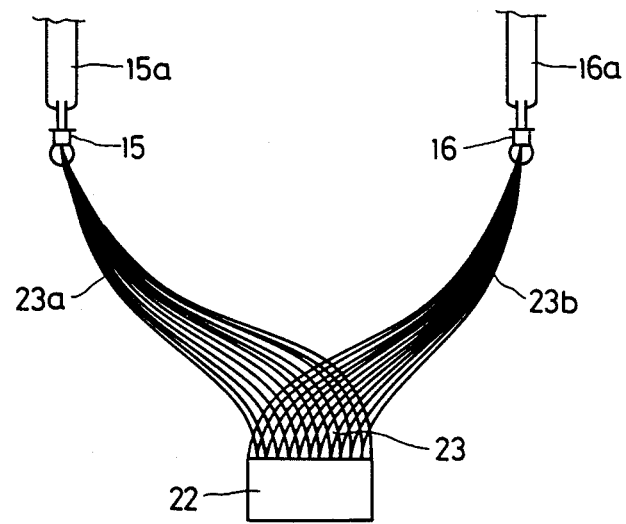
Figure 27:
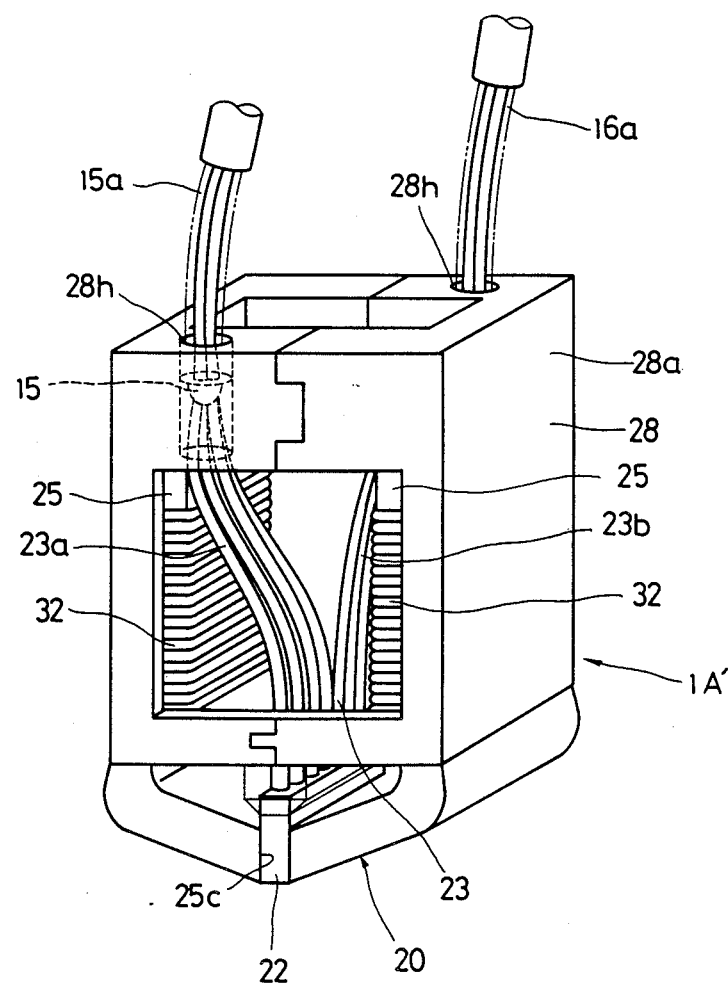
Figure 28:
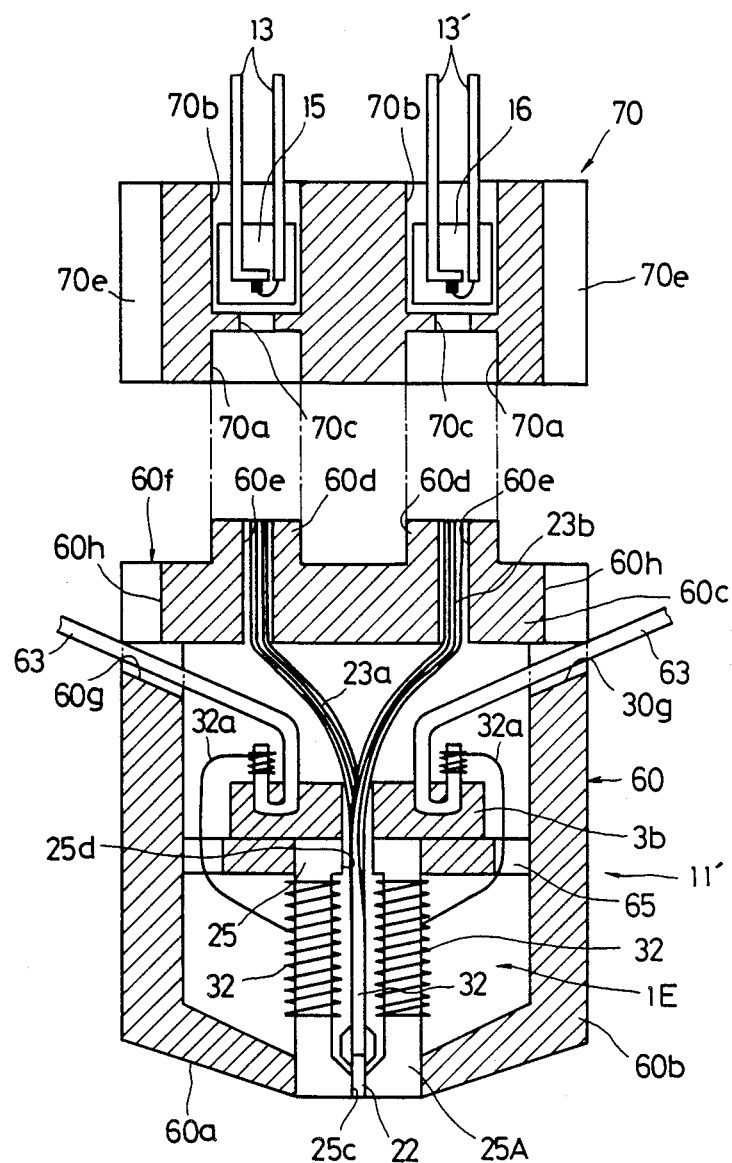
Figure 29:
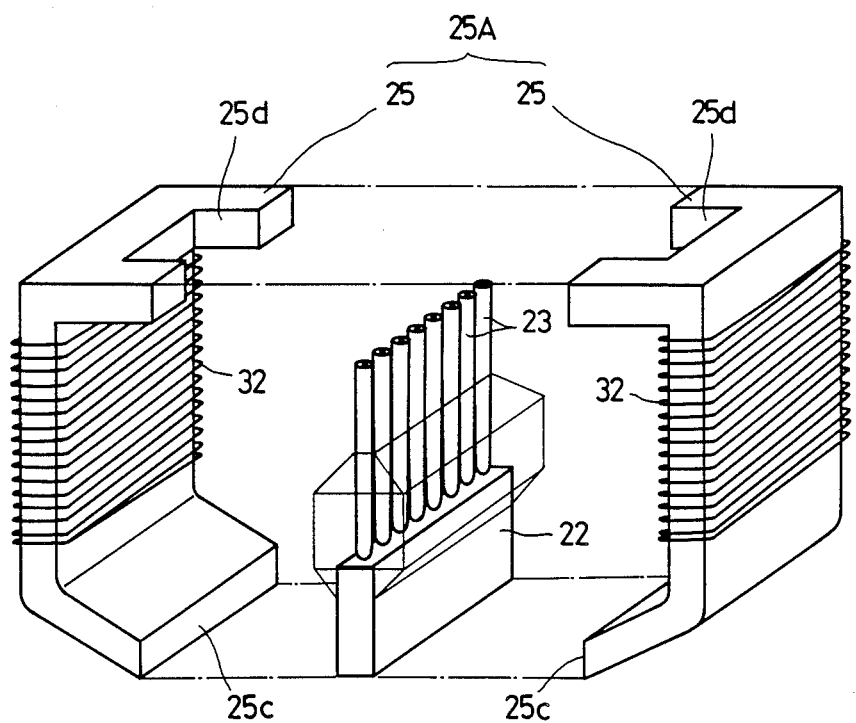
Figure 30:
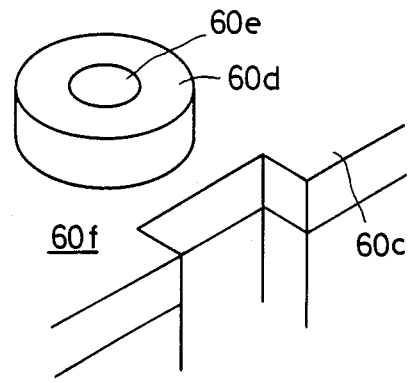
Figure 31:
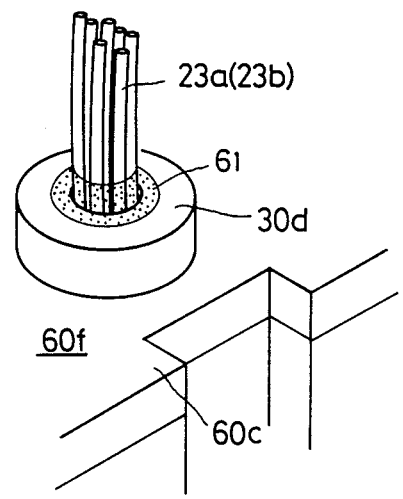
Figure 34:
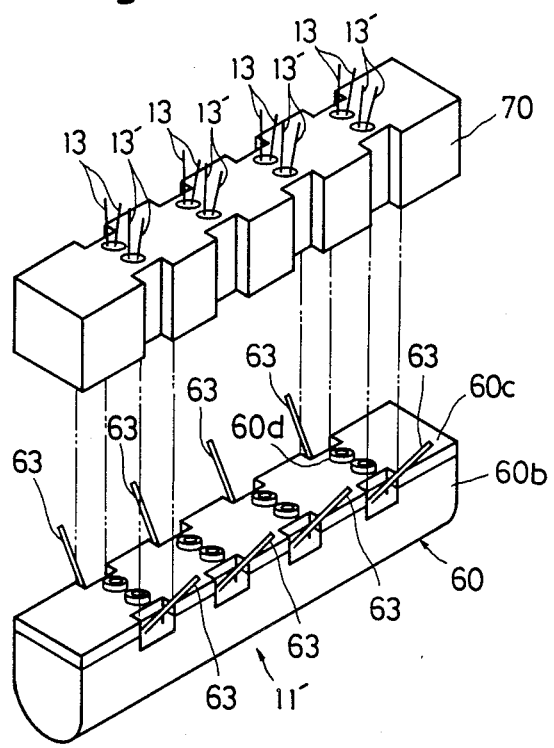
Figure 35:
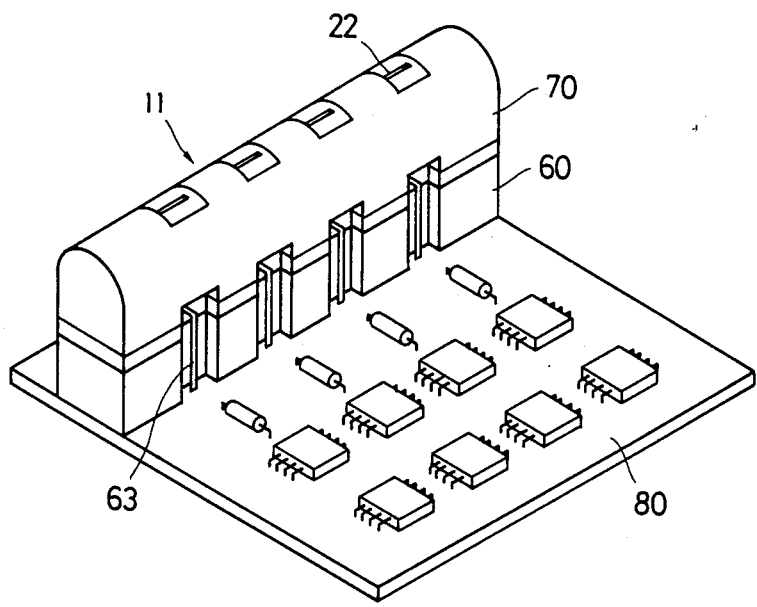

FIG. 19 is an enlarged sectional view of a principal part near a light transmitting member 22 of the composite magnetic and optical head, illustrating the way a light is propagated when a coating layer having a refractive index higher than that of the member 22 is formed at the interface of the member 22;

FIG. 20 is an enlarged sectional view of a principal part near a light transmitting member 22 of the composite magnetic and optical head, illustrating the way a light is propagated when a coating layer having a refractive index lower than that of the member 22 is formed at the interface of the member 22;

FIG. 21 is an enlarged perspective view of the light transmission member 22 of the composite head;

FIG. 22 is a block diagram showing a configuration of a photometric device for measuring an optical loss of an optical sensor of the composite head;

FIG. 23 is a perspective view of a shaping mold for preshaping an optical fiber bundle of the composite head into a predetermined configuration;

FIG. 24 is a perspective view showing a modification of the shaping mold;

FIG. 25 is a perspective view of the optical fiber bundle fitted in the shaping mold of FIG. 24 and subjected to a hardening process such that a coating material, applied to the outer surface of the fiber bundle, is hardened by means of ultraviolet radiation;

FIG. 26 is an enlarged front view showing the principal part of the optical sensor of the composite head;

FIG. 27 is a perspective view of a composite head in which a light emitting element 15 and a light sensing element 16 of the optical sensor are embedded in apertures 28h of a holder 28;

FIG. 28 is an exploded longitudinal sectional view of a composite multihead incorporating the composite magnetic and optical heads according to the present invention;

FIG. 29 is an exploded perspective view of a composite magnetic and optical head incorporated in the composite multihead 11' shown in FIG. 28;

FIGS. 30 to 33 are process diagrams illustrating steps of end face processing for an optical fiber bundle to be exposed on a rear face 60f of a case (or holder) of the composite multihead 11' shown in FIG. 28;

FIG. 34 is an exploded perspective view showing the case (or holder) of the composite multihead 11', incorporating a number of composite heads magnetic and optical according to the present invention, and a holder 70 for holding light emitting and sensing elements; and FIG. 35 is a perspective view of the composite multihead 11' mounted on a circuit board.

DETAILED DESCRIPTION

Referring first to FIGS. 1 to 7, a prior art composite magnetic and optical head will be described. Throughout the following description, a composite magnetic and optical head is referred to simply as a composite head for ease of description.

Figure 1:
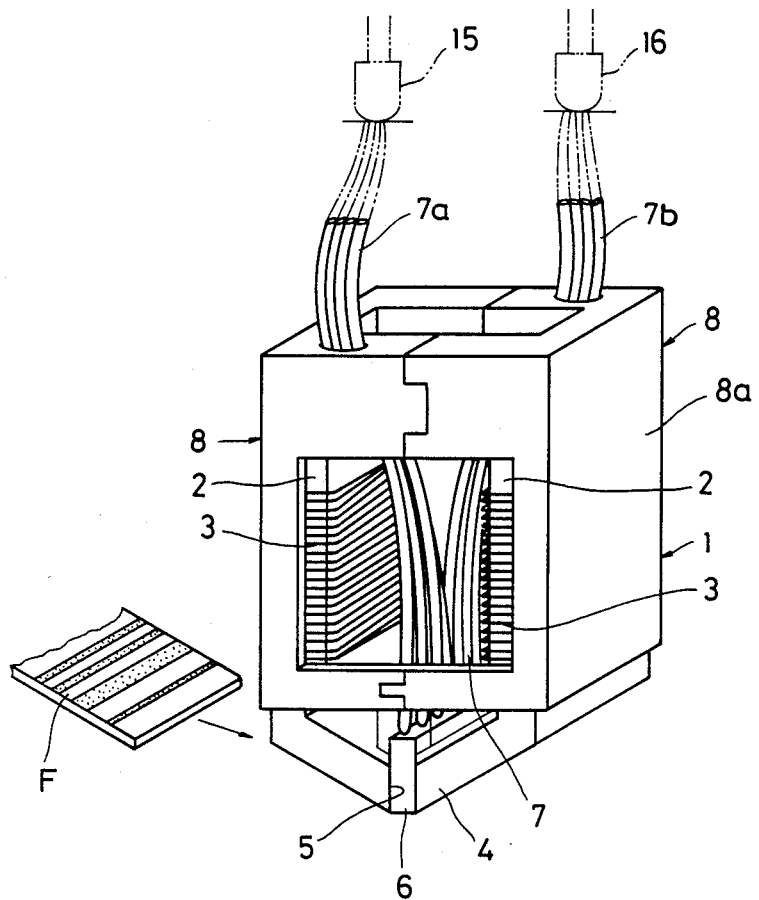
Figure 2:
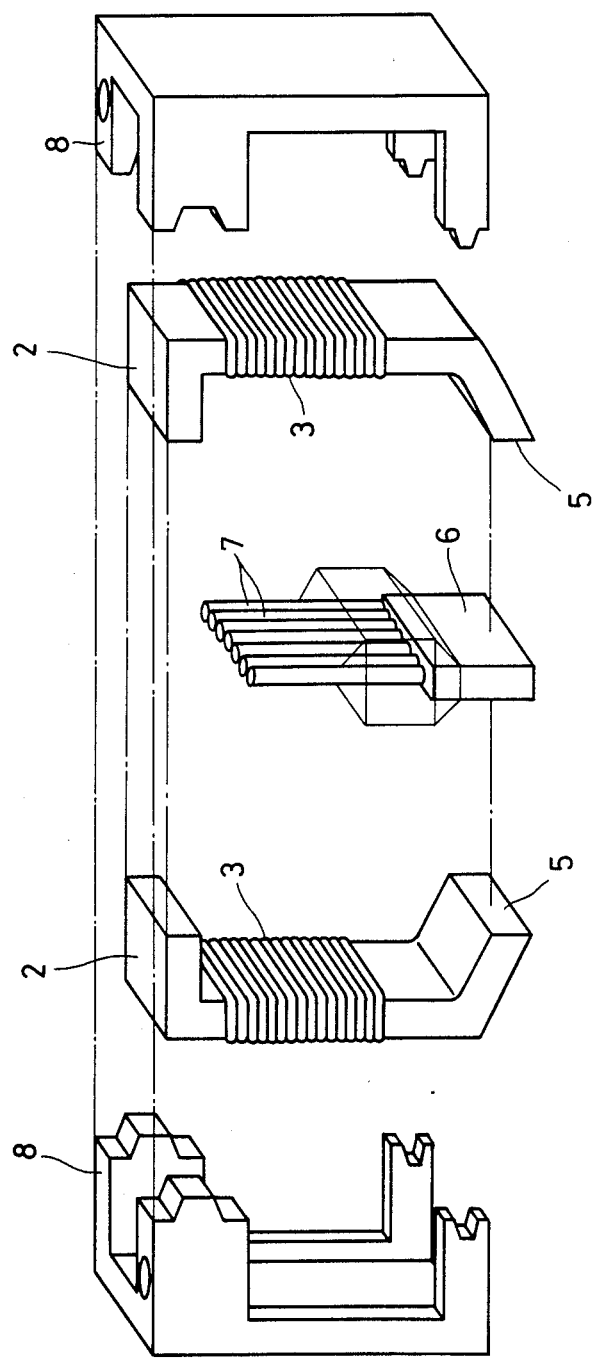
FIG. 2 is an exploded perspective view of the prior art composite head shown in FIG. 1.
Figure 3:
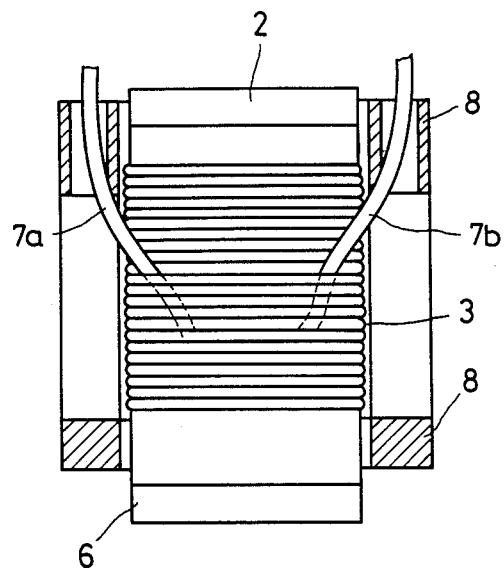
FIG. 3 is a longitudinal sectional view of the prior art composite head shown in FIG. 1.

In a prior art composite head 1, as shown in FIGS. 1 to 3, a light transmitting member (optical member) 6 formed of a light transmitting nonmagnetic material is attached to a magnetic detector gap (distal gap) 5 of a magnetic sensor 4, which is formed by winding coils 3 on magnetic cores 2. An optical fiber bundle 7, used to read optical data, is connected to the optical member 6, and the magnetic sensor 4 is covered with a bisected holder 8 for holding and fixing the same. The optical fiber bundle 7 is divided into two bundles 7a and 7b, which extend outward from the holder 8. A light emitting element 15 and a light sensing element 16 are optically coupled to the end faces of fiber bundles 7a and 7b, respectively.

Figure 4:
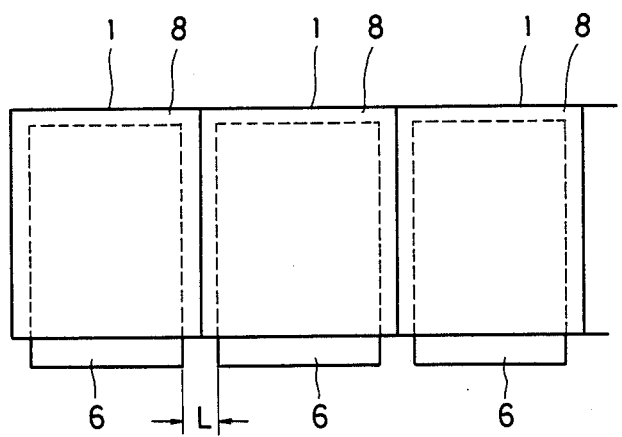
FIG. 4 is a block plan view for illustrating problems caused if a plurality of prior art composite heads shown in FIG. 1 are arranged side by side.

A record medium, such as paper money, is identified by means of a multihead composed of a plurality of composite heads 1 arranged in a row, as shown in FIG. 4. In the prior art composite head 1, as shown in FIG. 3, the width of holder 8 is greater than that of the optical member 6 which is attached to the magnetic detector gap 5. Therefore, a gap L is formed between the optical members 6 of each two adjacent composite heads 1, so that it is hard to identify the record medium with high accuracy.

Figure 5:
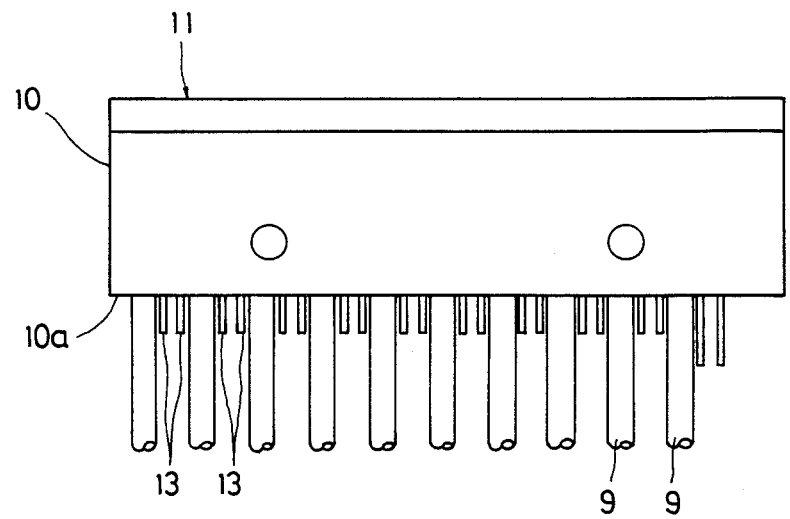
FIG. 5 is a side view of a composite multihead incorporating a plurality of prior art composite heads shown in FIG. 1.
Figure 6:
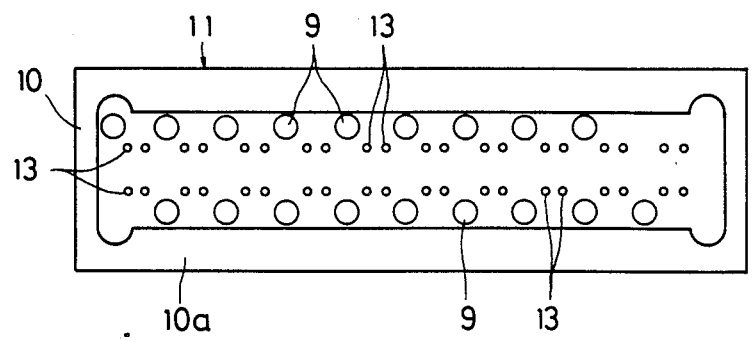
FIG. 6 is a bottom view of the composite multihead shown in FIG. 5.
Figure 7:
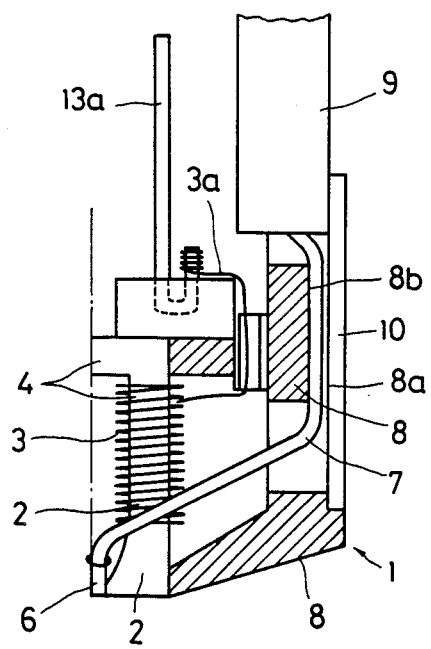
FIG. 7 is a partial sectional view of the composite multihead shown in FIG. 5.

In forming a multihead 11 using the prior art composite heads 1, the heads 1 are put into an outer case 10, as shown in FIGS. 5 and 6. In the composite multihead 11, as shown in FIG. 7, a step portion 8b is formed on a side face 8a of the holder 8 of each composite head 1, the optical fiber bundle 7 is passed through a gap (e.g., about 0.5 mm wide) between the step portion 8b and the outer case 10. Further, the fiber bundle 7 is passed through a protective tube 9, and is then drawn out from a bottom face 10a of the outer case 10, as shown in FIGS. 5 and 6. In FIGS. 5 and 6, numeral 13 designates magnetic terminals or pins each consisting of the distal end portion of a pipe 13a, which is connected to its corresponding lead wire 3a of the magnetic sensor 4, and projects from the bottom face 10a of the outer case 10.

In the prior art composite multihead 11, a number of optical fiber bundles 7 and the magnetic pins 13 are disposed mixedly in a narrow space, as shown in FIGS. 6 and 7. At the time of mounting, therefore, the multihead 11 must be handled with the greatest possible care. In incorporating the composite heads 1 into the outer case 10, for example, the fiber bundle 7 may possibly be drawn into the holder 8. In soldering external electric wires to the magnetic pins 13 shown in FIGS. 5 and 6, moreover, a soldering iron sometimes may touch the protective tubes 9, which project from the outer case 10. If the optical fibers are plastic fibers, in particular, they may be damaged or cut off when they are touched by the soldering iron through the protective tube 9.

Figure 8:
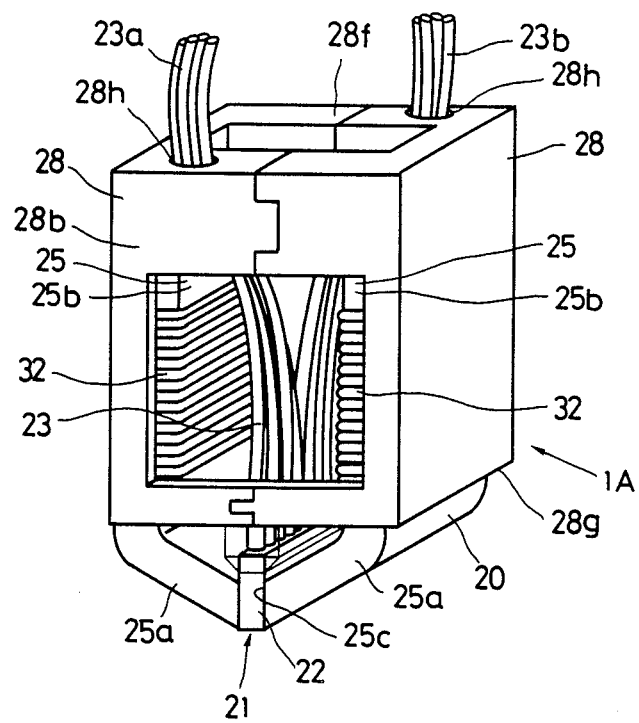
FIG. 8 is a perspective view of a composite magnetic and optical head according to a first embodiment of the present invention.
Figure 9:
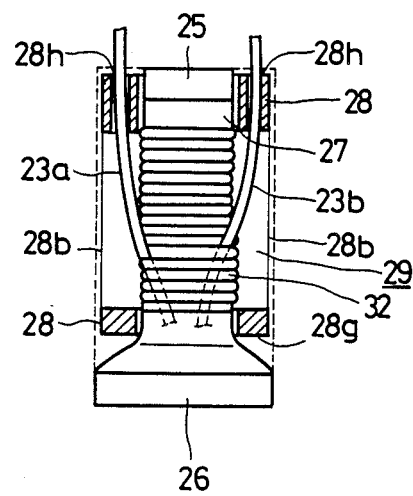
FIG. 9 is a longitudinal sectional view of the composite head shown in FIG. 8.
Figure 10:
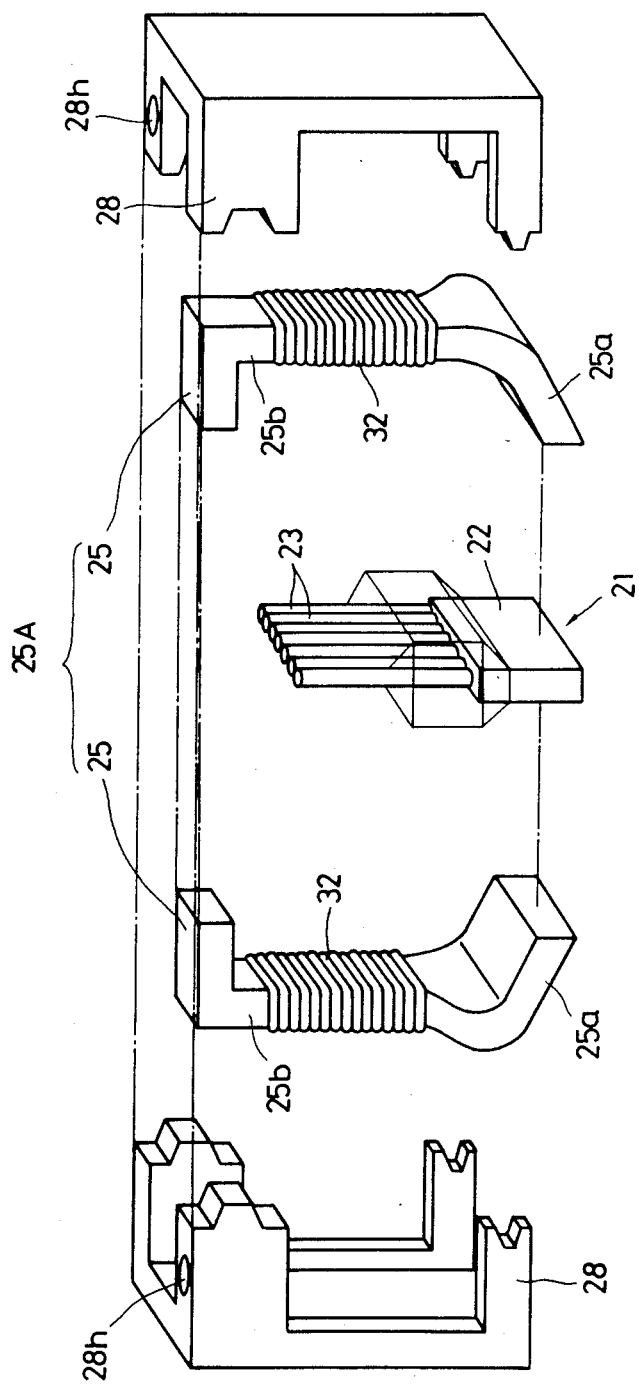
FIG. 10 is an exploded perspective view of the composite head shown in FIG. 8.

Referring now to FIGS. 8, 9 and 10, a first embodiment of the present invention will be described. A composite head 1A according to this embodiment comprises a magnetic sensor 20 for reading a magnetic pattern, an optical sensor 21 for reading an optical pattern, and a holder 28 for fixing and holding these sensors. A magnetic core assembly 25A of the magnetic sensor 20 comprises a pair of cores 25, arranged symmetrically with respect to a plane extending along the distal gap 25c, and coils 32 wound individually on the cores 25. The optical sensor 21 includes a light transmitting member (optical member) 22 and an optical fiber bundle 23. The optical member 22, which is formed of a light transmitting nonmagnetic material, has the shape of a rectangular prism. The fiber bundle 23 includes a number optical fibers whose corresponding ends are coupled in line to the optical member 22. The optical member 22, thus coupled with the optical fiber bundle 23, is fitted in the distal gap 25c so as to be held between the paired magnetic cores 25. The magnetic sensor 20, holding the optical member 22, is held and fixed by the bisected holder 28. The holder 28 is in the form of a case whose top and bottom end walls 28f and 28g and side walls 28b, 28b, extending at right angles to the length of the distal gap 25c of the magnetic sensor 20, are each formed with a rectangular window. The holder 28 is divided into two parts substantially symmetrical with respect to a plane extending along the distal gap 25c. The magnetic sensor 20 is supported by the holder 28 so that its distal gap 25c projects downward from the bottom end wall 28g of the holder 28.

The optical fiber bundle 23, which is coupled to the optical member 22, is divided into two bundles 23a and 23b, which extend outward through oval apertures 28h in the top wall of the holder 28, individually. As in the case of the prior art composite head 1 shown in FIG. 1, a light emitting element and a light sensing element are optically coupled to the end faces of the fiber bundles 23a and 23b, respectively.

The composite head 1A according to this embodiment differs from the conventional one shown in FIG. 1 in that the region near the distal gap 25c of the magnetic core assembly 25A is a little wider than the holder 28 and projects laterally outward from the respective outer surfaces of the two opposite side walls 28b, 28b of the holder 28 (see FIG. 9). More specifically, each magnetic core 25 includes a wide portion 25a, which projects downward from the bottom end wall 28g and is not surrounded by the holder 28, in the vicinity of the distal gap 25c, and a narrow portion 21b, which is located inside the bottom end wall 28g so as to be surrounded by the holder 28, and is wound with the coil 32. The width of the narrow portion 25b is, for example, half that of the wide portion 25a or of the prior art core. Even though the cross-sectional area of the narrow portion 25b is half that of the prior art counterpart, the ratio of the magnetic field strength of that portion (narrow portion 25b) of each magnetic core 25 wound with the coil 32 to that obtained in the prior art case is 0.9979 : 1, which indicates hardly any difference. Thus, the coil 32 can enjoy the same number of turns as its prior art counterpart.

A plurality of such composite heads 1A are arranged in a row to form a multihead. In doing this, as seen from FIG. 9, the gaps 25c of the magnetic core assemblies 25A and the optical members 22 of each two adjacent composite heads 1A can be arranged close to one another, without being hindered by their corresponding holders 28. Thus, the multihead is enabled to identify the record medium with high accuracy. Since the narrow portion 25b of each magnetic core 25 is made narrower, moreover, the size of the composite head 1A can be reduced in proportion. As shown in FIG. 9, a space 29 is defined between the narrow portions 25b of the magnetic cores 25 and the holder 28. Since the narrow portions 25c are narrower than in the conventional case, the space 29 is wider than that of the prior art composite head. With use of this space 29, the optical fiber bundle 23 can be easily drawn out of the holder 28 through the limited space inside the holder 28. At the time of assembling, moreover, the space 29 serves to protect the optical fiber bundle 23 from an undue force.

Figure 11:
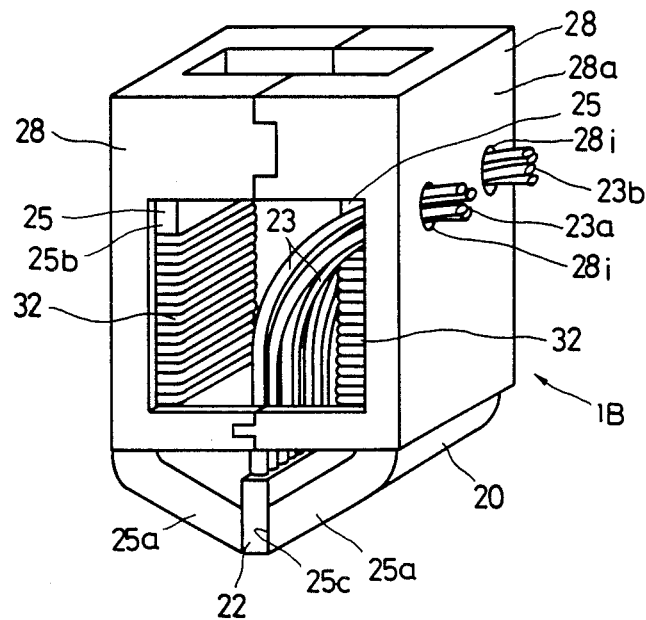
FIG. 11 is a perspective view of a composite magnetic and optical head according to a second embodiment of the present invention.
Figure 12:
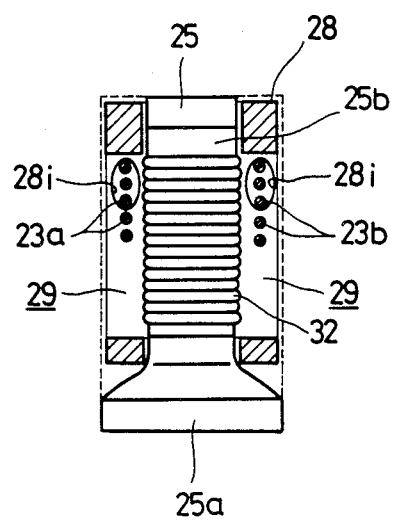
FIG. 12 is a longitudinal sectional view of the composite head shown in FIG. 11.
Figure 13:
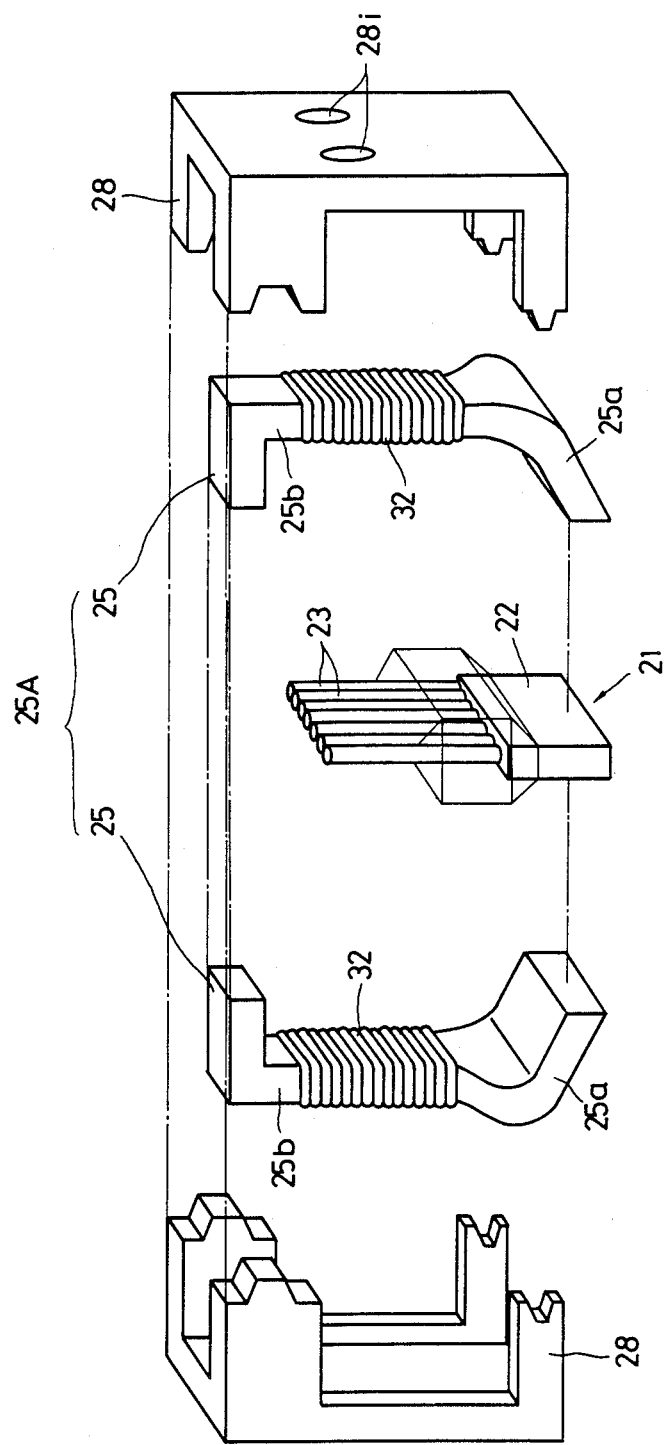
FIG. 13 is an exploded perspective view of the composite head shown in FIG. 11.

FIGS. 11, 12 and 13 show a second embodiment of the present invention. A composite head 1B of this embodiment differs from the composite head of the first embodiment only in that its optical fiber bundle 23 is drawn out of a holder 28 through oval apertures 28i in one side wall 28a of the holder 28. More specifically, a pair of apertures 28i are bored through the one side wall 28a of the bisected holder 28 of the second embodiment. The apertures 28i, which open to the space 29, are situated on either side of the narrow portion 25b of each corresponding magnetic core 25. Optical fiber bundles 23a and 23b, passed through the space 29, are drawn out of the holder 28 through their corresponding apertures 28i. In FIGS. 8 to 13, like reference numerals refer to like portions throughout the drawings.

Figure 14:
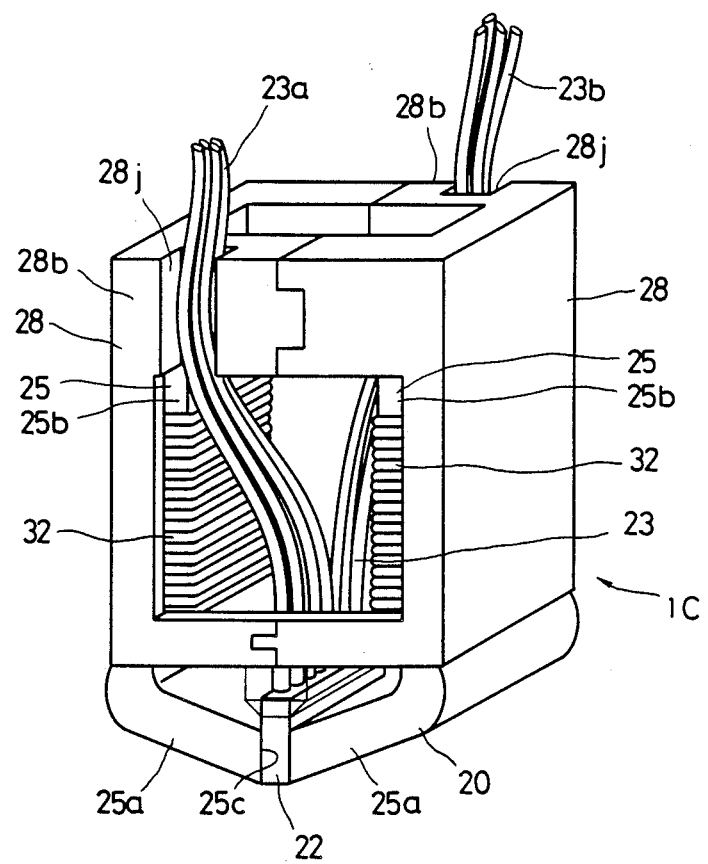
FIG. 14 is a perspective view of a composite magnetic and optical head according to a third embodiment of the present invention.
Figure 15:
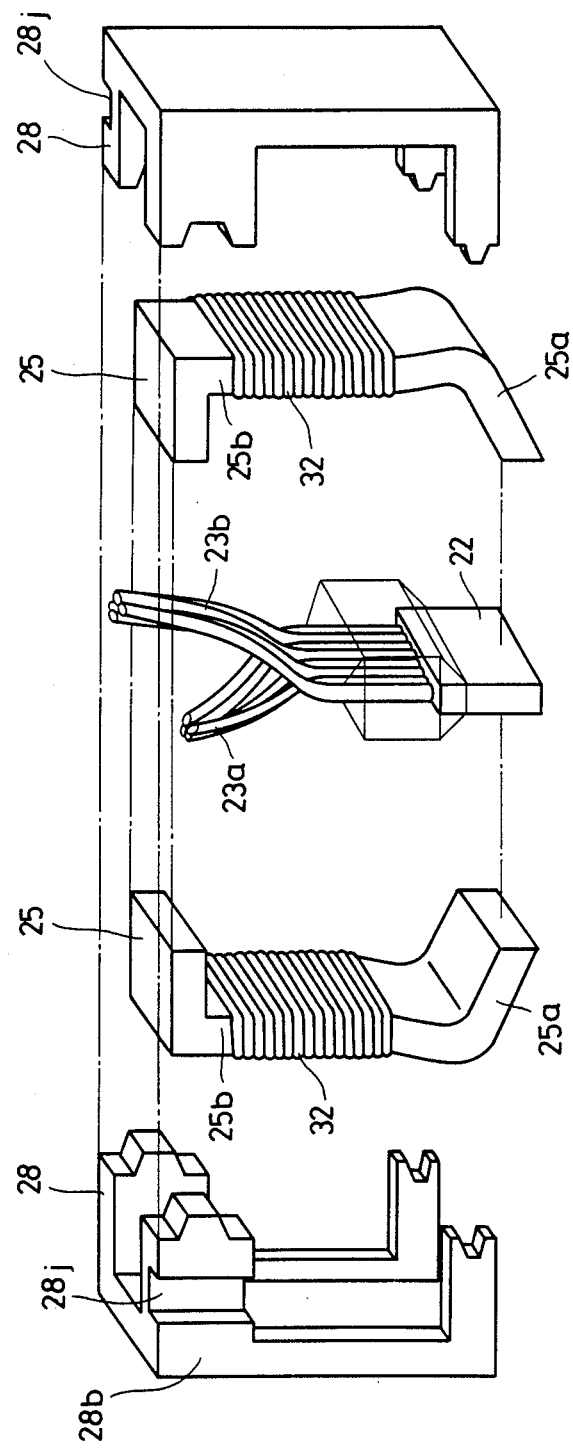
FIG. 15 is an exploded perspective view of the composite head shown in FIG. 14.

FIGS. 14 and 15 show a third embodiment of the present invention. A composite head 1C of this embodiment differs from the composite heads of the first and second embodiments only in that its optical fiber bundles 23a and 23b are drawn out of a holder 28 along their corresponding guide grooves 28j, which extend vertically on the outer surfaces of the respective top portions of two opposite side walls 28b, 28b of the holder 28. In FIGS. 8 to 15, like reference numerals refer to like portions throughout the drawings.

Figure 18:
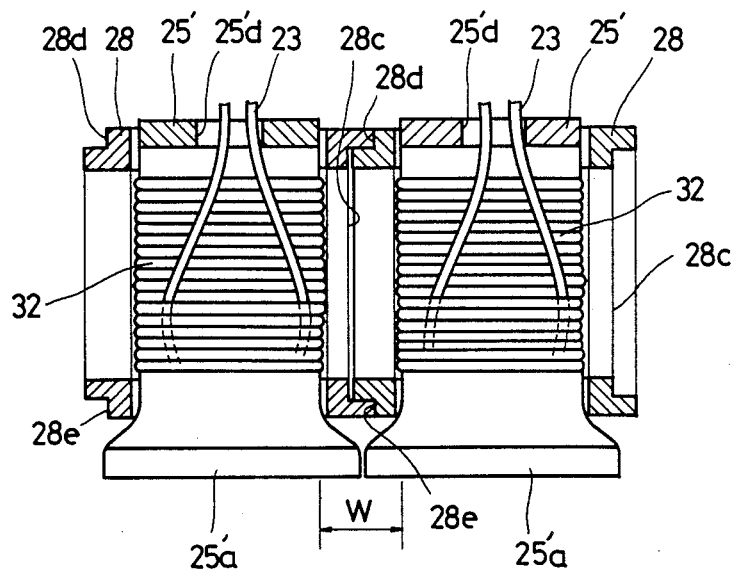
FIG. 18 is a longitudinal sectional view showing the way a plurality of composite heads shown in FIG. 16 are arranged side by side.
Figure 16:
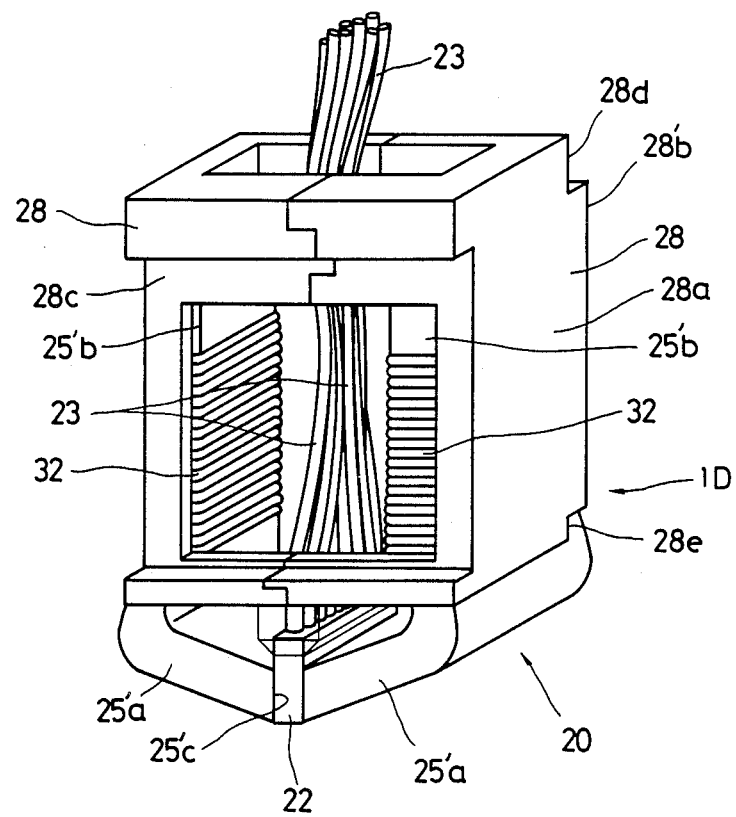
FIG. 16 is a perspective view of a composite magnetic and optical head according to a fourth embodiment of the present invention.
Figure 17:
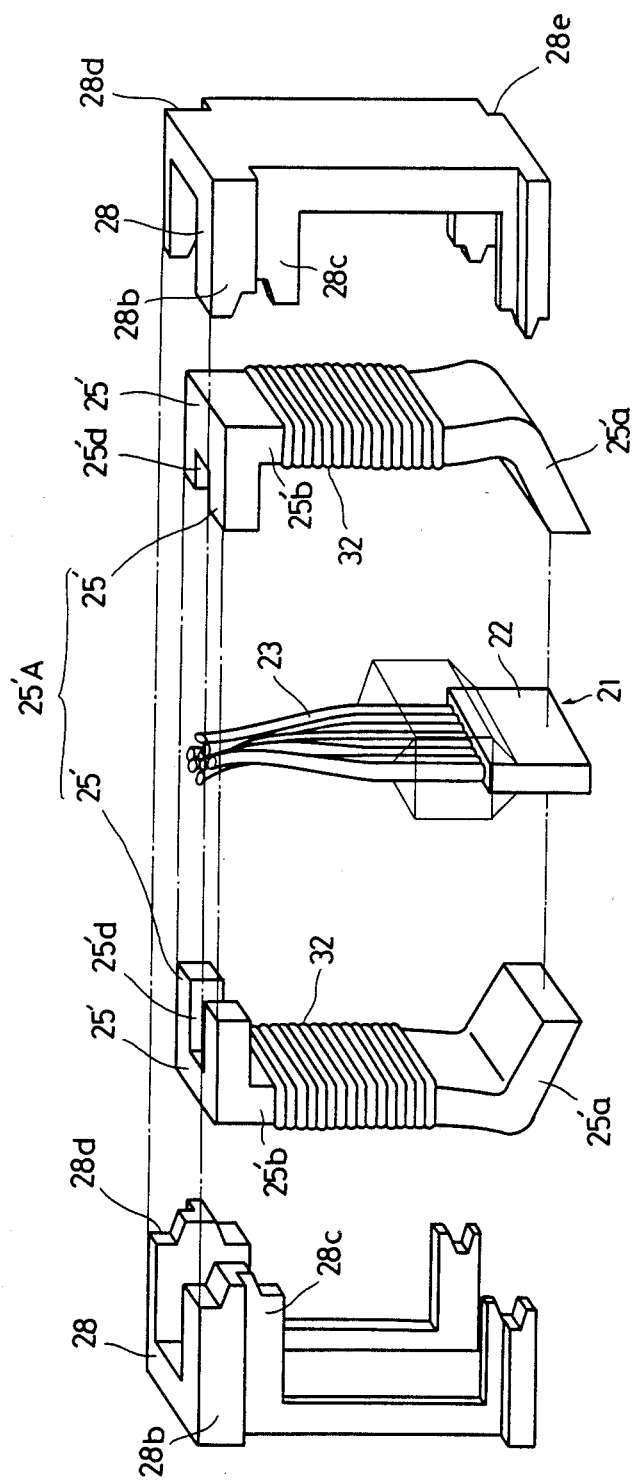
FIG. 17 is an exploded perspective view of the composite head shown in FIG. 16.

FIGS. 16, 17 and 18 show a fourth embodiment of the present invention. In a composite head 1D of this embodiment, a step portion 28c is formed on one side wall 28b of its holder 28 which extends at right angles to a distal gap 25c of a magnetic sensor 20. The step portion 28c extends along the upper and lower side edges of the side wall 28b. The upper and lower side edges of the other side wall 28b' are cut, thus forming step portions 28d and 28e. When the individual composite heads 1D are arranged side by side so that each two adjacent holders 28 abut each other, as shown in FIG. 18, the step portion 28c of the side wall 28b engages the step portions 28d and 28e of its corresponding wall 28b'. In this state, a gap W is secured between narrow portions 25'b of magnetic cores 25' of the adjacent composite heads 1D. The gap W is narrower than the gap L of the prior art composite heads 1 shown in FIG. 4 by a margin attributable to the step portions 28c, 28d and 28e of the side walls 28b and 28b'. Accordingly, the narrow portion 25'b of each magnetic core 25' need not be narrowed so much as in the cases of the first to third embodiments. In the first to third embodiments, it is necessary only that the narrow portion 25b of the magnetic core 25 be narrower than the wide portion 25a at least by a margin equivalent to the width of the gap L. In the fourth embodiment, on the other hand, the narrow portion 25'b must only be narrower by a margin equivalent to the width of the gap W.

As described above, the side walls 28b and 28b' are formed with the step portions 28c, 28d and 28e, respectively, whereby they can engage each other in a fitted manner such that the distance between each two adjacent magnetic core assemblies 25'A are reduced by (L−W). Moreover, the wide portion 25'a is at least wider than the distance between the side walls 28b and 28b'. Thus, the medium identification accuracy can be improved.

The presence of the step portions 28c, 28d and 28e makes it difficult to draw out an optical fiber bundle 23 out of the holder 28 through such guide means as the apertures 28h and 28i or the grooves 28j described in connection with the first to third embodiments. In the case of the fourth embodiment, therefore, the optical fiber bundle 23 is drawn out through a guide opening 25'd bored through the central portion of the top wall of the magnetic core assembly 25'A, as shown in FIG. 17. In this case, the ratio of the magnetic field strength obtained with use of the guide opening 25'd to that obtained in the prior art case is 0.9979 : 1, which indicates hardly any difference, even though the effective magnetic-path sectional area of the opening portion of the core assembly 25'A is half that of its counterpart without the guide opening 25'd. Thus, the number of turns of the coil 32 need not be increased.

In the first to fourth embodiments, the magnetic core assembly 25A (25'A) is finally filled with a resin, such as epoxy resin. In general, the refractive index of an epoxy-based filler material is higher than that of a clad material for optical fibers. If the optical fibers are directly touched by this filler material, therefore, an optical loss increases. When the magnetic core assembly 25A (25'A) is packed with the filler material, the resin penetrates into a space between the opposed surfaces of the core assembly 25A (25'A) and the optical member 22 as the light transmitting member. Accordingly, the epoxy resin, which has a high refractive index, touches the optical member 22, so that a reflected light from the record medium F leaks out through the epoxy resin 50C and both side faces (interfaces) 22a and 22b of the optical member 22, as shown in FIG. 19. Thus, the sensitivity for optical pattern detection may possibly be lowered.

In order to prevent the aforesaid optical loss, at least the interfaces 22a and 22b of the optical member 22, surrounded by points A, D, H and E and points B, C, G and F, respectively, in FIG. 21, are first formed with a coating layer, e.g., an organic molecular layer 50, whose refractive index is lower than that of the optical member 22, as shown in FIGS. 20 and 21. Thus, with use of the lower-refraction organic molecular layer 50, the light propagated through the optical member 22 never leaks, so that the signal-to-noise ratio and sensitivity are improved.

FIG. 22 shows a photometric device for detecting the amount of optical loss caused by the formation of the organic molecular layer 50. In this device, a light beam of 660 nm emitted from an LED is guided by means of a plastic optical fiber 52 of 1.0-mm diameter, and is optically coupled to the optical fiber bundle 23a for incidence of the composite head 1A (1B, 1C or 1D) of the present invention by means of a V-groove connector 53. In this state, optical loss PO at the outlet end of the optical fiber 52 is 14.5 dBm for the output light of the LED.

Output P2 of the emission-side optical fiber bundle 23b, obtained when the detection surface of the optical member 22 in contact with the record medium is released infinitely, is defined as nonreflective (black), while output P2 obtained when a white paper sheet is in intimate contact with the detection surface of the optical member 22 is defined as totally reflective (white). On this assumption, optical loss P2 at the outlet end of the optical fiber 23b of the composite head 1A (1B to 1D), with various organic molecular layers as samples formed at the interfaces 22a and 22b, was measured by using the aforesaid photometric device. Table 1 shows the measured optical loss (P0−P2). Eight plastic optical fibers 23 were arranged on each of the incidence and emission sides to be connected to the respective optical members 22 of the composite heads. The optical fibers 23 used have Sendust cores and are 10 cm long. The width of each optical member 22 (width of the distal gap 5) is 300 μm.

TABLE 1

| Material of Optical Member (refractive index) | Material of High Mol. Layer (refractive index) | P0−P2 | | Black − White |
|---|---|---|---|---|
| | | Black | White | |
| 1* Quartz (1.46) | Epoxy (1.53) | 29.1 | 24.6 | 4.5 |
| | | 28.9 | 24.6 | 4.3 |
| | | 27.8 | 23.5 | 4.3 |
| | | (28.6) | (24.2) | (4.3) |
| 2 Quartz (1.46) | UV Resin (1.43) | 29.0 | 23.2 | 5.8 |
| | | 28.0 | 22.5 | 5.5 |
| | | 28.3 | 22.8 | 5.5 |
| | | (28.4) | (22.6) | (5.6) |
| 3 Potassium Soda Lead (1.67) | Epoxy (1.53) | 28.7 | 22.5 | 6.2 |
| | | 28.3 | 22.3 | 6.0 |
| | | 28.6 | 23.7 | 5.9 |
| | | (28.5) | (22.8) | (6.0) |

*: Control
Parenthesized figures indicate mean values.

In a nonreflection (black) mode, as seen from Table 1, composite heads having organic molecular layers with refractive indexes lower and higher than that of the optical member 22, at the interfaces 22a and 22b, are subject to optical losses (P0−P2) of substantially equal values. In a total reflection (white) mode, on the other hand, the optical loss of the head with the lower-refraction layer is about 1.2 to 1.4 dB lower than that of the head with the higher-refraction layer.

Meanwhile, the optical fiber bundle 23 to be fitted in the composite head 1A (1B to 1D) is previously preshaped by means of a shaping mold 55 or 56 shown in FIG. 23 or 24, for example. The molds 55 and 56 are suitably used to preshape the optical fibers 23 for the composite heads 1A and 1C shown in FIGS. 8 and 14 and that for the head 1D shown in FIG. 16, respectively. The shaping mold 55 has hollows 55a, 55b and 55c, while the shaping mold 56 has hollows 56a and 56b. These hollows are adapted to receive the optical member 22, the junction of the optical member 22 and the optical fiber bundle 23, and the fiber bundle 23 (or bundles 23a and 23b). The hollows 55b and 55c of the mold 55 and the hollow 56b of the mold 56 have a suitable shape for the curvature of the optical fiber bundle 23 (or bundles 23a and 23b), e.g., the same configuration as the inside of the composite head or a somewhat smaller shape.

In shaping the optical fiber bundle 23 for the composite head 1D shown in FIG. 16 by means of the shaping mold 56, for example, the fiber bundle 23 is first coated with an unhardened resin coating material, e.g., UV resin (refractive index: 1.43) having a refractive index lower than that (1.53) of epoxy resin which is to be finally filled into the holder 28 of the head 1D. Thereafter, the optical member 22 and the junction are fitted into the hollow 56a of the mold 56, and the optical fiber bundle 23 into the hollow 56b. Then, the fiber bundle portion is pressed and fixed by means of a quartz plate 57, as shown in FIG. 25. Subsequently, UV radiation is applied to the fiber bundle 23, which is coated with the unhardened UV resin, thereby hardening the resin. Thus, the optical fiber bundle 23 is solidified in the same shape as when it is fitted into the hollow 56b.

In this manner, the optical fiber bundle 23 is preshaped into a predetermined configuration, and is then solidified. By doing this, the fiber bundle 23 can be fitted directly into the composite head 1D without being subjected to any undue force. Accordingly, the fiber bundle 23 can be mounted in a short time without damaging the junction between itself and the optical member 22. Thus, the optical fiber bundle 23 is very easy to handle. Since the outer surface of the fiber bundle 23 is covered with the low-refraction resin, moreover, the filler material, which finally fills the holder 28 of the composite head 1D, cannot directly touch the optical fiber 23. Thus, the optical loss is prevented from increasing.

The method for preshaping the optical fiber bundle is not limited to the aforementioned method. If optical fibers constituting the optical fiber bundle are plastic fibers, they may alternatively be preshaped by heating. In this case, it is necessary only that the fiber bundle be kept in a furnace of e.g. 90° C. for an hour or thereabout. The respective optical losses of the composite head using the UV-coated, preshaped optical fiber bundle 23 and a composite head using an uncoated optical fiber bundle, for use as a control, were measured by means of the photometric device shown in FIG. 22. Table 2 shows the result of the measurement.

TABLE 2

|   |   | P0–P2 | | Black – White |
|---|---|---|---|---|
|   |   | Black | White |   |
| 4* | No UV Coating | 28.5 | 24.3 | 4.2 |
|   |   | 28.4 | 24.1 | 4.3 |
|   |   | 28.9 | 24.6 | 4.3 |
|   |   | (28.6) | (24.3) | (4.3) |
| 5 | UV-Coated | 28.7 | 22.7 | 6.0 |
|   |   | 28.3 | 23.0 | 5.7 |
|   |   | 28.3 | 22.6 | 5.7 |
|   |   | (28.4) | (22.8) | (5.8) |

*: Control
Parenthesized figures indicate mean values.

In the nonreflection (black) mode, as seen from Table 2, a composite head using an optical fiber bundle without the UV-resin coating and another one using an optical fiber bundle coated with the UV resin are subject to optical losses (P0–P2) of substantially equal values. In the total reflection (white) mode, on the other hand, the optical loss of the latter head is lower than that of the former by about 1.5 dB or thereabout on the average.

When forming a multihead from the composite heads according to the present invention, each composite head should preferably be constructed so that the optical fiber bundle is not adapted to be drawn out of the head. FIGS. 26 and 27 show a composite head 1A' of a type such that a light emitting element 15 and a light sensing element 16, attached to the end faces of their corresponding optical fiber bundles 23a and 23b, are embedded individually in a pair of apertures 28h of a holder 28. The head 1A' includes an optical member 22, the optical fiber bundle 23, and the light emitting and sensing elements 15 and 16. The elements 15 and 16 are connected to the respective end faces of the incidence and emission-side optical fiber bundles 23a and 23b of the fiber bundle 23. As shown in FIG. 26, all these components of the head 1A' are previously bonded together by means of a liquid resin or the like. As shown in FIG. 27, moreover, the optical member 22 is incorporated into a distal gap 25c of a magnetic sensor 20, and the light emitting and sensing elements 15 and 16 are fixed individually in the apertures 28h of the holder 28 by means of a bonding agent. At this time, it is necessary only that lead wires 15a and 16a of the elements 15 and 16 be drawn out of the composite head 1A' for a suitable length.

In this manner, the light emitting and sensing elements 15 and 16 are contained in their corresponding apertures 28h bored through the holder 28, and only the lead wires 15a and 16a are drawn out of the composite head 1A', that is, the optical fiber bundle 23 is kept within the head 1A'. Thus, the fiber arrangement is simple. When using the outer case 10, as shown in FIGS. 5 and 6, to house a plurality of composite heads 1A', the mounting work is easy because the fiber bundles 23 need not be drawn out of the case 10. During the soldering work, moreover, the fiber bundles are prevented from being touched and burned by a soldering iron. Thus, the soldering work is facilitated.

When forming a multihead by using the outer case 10 to house a plurality of composite heads, as shown in FIG. 7, the light emitting and sensing elements 15 and 16 may be fixedly arranged within the space between the case 10 and the step portion 8b on the side face 8a of the holder 8.

As shown in FIGS. 28 to 35, furthermore, the multihead can more easily be mounted on a circuit board if it is formed by using the composite heads according to the present invention. FIG. 28 is a sectional view of a composite head according to the present invention, and FIGS. 34 and 35 show an application of a composite multihead which, incorporating a number of composite heads, is mounted on a circuit board. In these drawings, like reference numerals are used to designate like components having substantially the same functions or effects as those of the composite head 1A shown in FIGS. 8 to 10.

A magnetic sensor 20 of a composite head 1E of this embodiment is wholly surrounded by a case (holder) 60 except the region near its distal gap 25c. A number of magnetic sensors 20 are contained in the case 60, thus forming a multihead 11'. The gapside portion of a magnetic core assembly 25A of each magnetic sensor 20 is supported by one side face 60a of the case 60, while that end portion of the core assembly 25A on the opposite side thereof to the distal gap 25c is supported by a holder 65.

As shown in FIG. 29, the magnetic core assembly 25A is halved, and an opening 25d is formed in the center of the end portion of the core assembly 25A opposite to the distal gap 25c. An optical fiber bundle 23 is adapted to be passed through the opening 25d. An optical member 22, which is formed of a light transmitting nonmagnetic material, is fitted in the distal gap 25c of the magnetic core assembly 25A. One end of the optical fiber bundle 23, formed in line along the gap 25c, is coupled to the back of the optical member 22. The fiber bundle 23 is drawn out of the core assembly 25A through the opening 25d.

Figure 32:
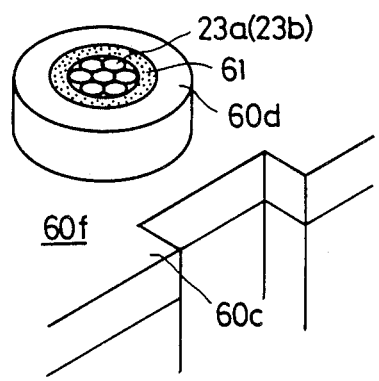
Figure 33:
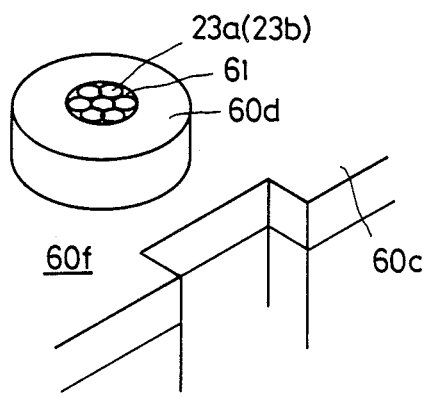

The case 60 is composed of a case body 60b, having a substantially U-shaped cross section, and a lid 60c covering the top opening of the case body 60b. A symmetrical pair of cylindrical projections 60d, with respect to the transverse direction of the lid 60c, protrude from an outer surface 60f of the lid 60c (opposite to the distal gap 25c), corresponding in position to each composite head 1E. A through hole 60e is bored through each projection 60d (see FIG. 30). After each optical fiber bundle 23 is drawn out of its corresponding magnetic core assembly 25A through the opening 25d thereof, it is divided into fiber bundles 23a and 23b for incidence and emission. The fiber bundles 23a and 23b are passed through their corresponding through holes 60e. After the lid 60c is fixed to the case body 60b, a fixing agent 61, such as a two-liquid epoxy resin, is poured into the spaces around the optical fiber bundles 23a and 23b to fix them in the through holes 60e (see FIG. 31). The fiber bundles 23a and 23b, thus fixed in their corresponding holes 60e, are cut along the respective end faces of the projections 60d (FIG. 32). The cut end faces of the fiber bundles 23a and 23b are buffed to be smoothed by means of a rotary buffing machine or the like (FIG. 33). Thus, the other end of the optical fiber bundle is fixed so that the other end face thereof is smoothed and exposed on the rear face 60f of the case 60 opposite to the distal gap 25c.

For each composite head 1E, two magnetic pins 63 are planted, at one end thereof, in a terminal board 32b which is fixed, inside the case 60, to that face of the holder 65 opposed to the lid 60c. The other end of each magnetic in 63 projects to the outside through its corresponding one of notches 60g cut in each side wall of the case body 60b. A lead wire 32a is connected to the one end of each magnetic pin 63. Notches 60h are cut in each side edge of the lid 60c, corresponding in position to the notches 60g in the case body 60b.

The case 60 is mounted on a holder 70 in which the light emitting elements 15 and the light sensing elements 16 are contained and held in position. More specifically, the holder 70 is in the form of a thick board having the same length and width as the case 60, which contains the composite heads 1E. Cylindrical holes 70a, as many as the projections 60d of the case 60, are bored in that face of the holder 70 which is opposed to the rear face 60f of the case 60. These holes 70a, which have a depth substantially equivalent to the height of the projections 60d, are adapted individually to receive the projections 60d. Holes 70b are bored in the opposite face of the holder 70 so as to be coaxial with their corresponding cylindrical holes 70a. The holes 70b are adapted to hold the light emitting elements 15 or the light sensing elements 16. Each hole 70a communicates with its corresponding hole 70b by means of an aperture 70c which substantially equal in diameter to the through hole 60e of each projection 60d. One light emitting element 15 and one light sensing element 16 are fixedly fitted individually in each adjacent pair of holes 70b arranged across the holder 70. Grooves 70e, which have the same depth as the notches 60h of the case 60, are formed on each side face of the holder 70 so as to extend vertically in alignment with their corresponding notches 60h.

In mounting the composite multihead 11' on circuit board 80, as shown in FIG. 35, the case 60, with the composite heads 1E therein, and the holder 70 are first joined together so that the projections 60d are fitted tight in their corresponding holes 70a. Then, the magnetic pins 63 are bent toward the holder 70. In this state, the magnetic pins 63 and terminals 13 and 13' of the light emitting and sensing elements 15 and 16 are inserted into through holes of the circuit board 80, and are soldered therein. Thus, the mounting of the multihead 11' is completed.

If the composite multihead 11', constructed in this manner, goes wrong due to electrical disconnection in any of the light emitting elements 15 or the like, it can be disengaged from the circuit board 80 by melting solder on the board 80. Thereupon, only the holder 70 can be replaced with a new one after it is separated from the case 60. Since the optical fiber bundles 23 are not drawn out of the case 60, the fiber arrangement is simple. At the time of assembling the composite heads 1E, moreover, the optical fibers cannot be touched and burned by a soldering iron. Furthermore, the optical fibers can easily be coupled optically to the holder 70, which contains the light emitting and sensing elements 15 and 16. Thus, the incorporation into the circuit board 80 and the soldering work are facilitated, and the whole structure, as well as the individual components, can be handled very easily.

According to the embodiment described above, the case 60 and the holder 70 are coupled together by fitting the projections 60d of the case 60 into the holes 70a of the holder 70. However, the method of coupling the case 60 and the holder 70, according to the present invention, is not limited to this manner. For example, the holder may be fixed to the case, by means of screws or the like, in a manner such that the respective exposed end faces of the optical fibers 23 are opposed to the light emitting or sensing elements in the holder, without the use of the projections 60d or the holes 70a.

Magnetic resistance elements or Hall elements may be used in place of the aforementioned magnetic coils 32 for detecting the magnetic pattern. Instead of utilizing the reflected light, moreover, transmitted light may be used to detect the optical pattern.

What is claimed is:

1. In a composite magnetic and optical head comprising:
a magnetic sensor including a magnetic core means having an elongated distal gap and adapted to detect a magnetic pattern recorded on a record medium;
an optical sensor including a nonmagnetic light transmitting member located along said distal gap of said magnetic sensor and an optical fiber bundle having one end connected to said light transmitting member, and adapted to detect an optical pattern recorded on said record medium; and a holder containing said magnetic and optical sensors in an internal space thereof, said holder having two opposite side walls extending substantially at right angles to the length of said distal gap of said magnetic core means and one end face from which said distal gap projects outward;

the improvement wherein:

said magnetic core means includes a wide portion, situated close to said distal gap and projecting outward from said one end face of said holder, and a narrow portion surrounded by said holder so as to be located behind said one end face, said wide portion being at least wider than the distance between said opposite side walls.

2. A composite head according to claim 1, wherein said light transmitting member has substantially the same length as said distal gap.

3. A composite head according to claim 1, wherein said opposite side walls of said holder are provided individually with first and second step portions, corresponding first and second step portions of each two adjacent holders being engageable with each other when a plurality of said composite heads are arranged with said distal gaps thereof situated on a straight line.

4. A composite head according to claim 1, wherein said internal space of said holder is filled with a filler material.

5. A composite head according to claim 4, wherein a coating layer having a refractive index lower than that of said light transmitting member is formed at least on that surface of said light transmitting member which faces an end face of said magnetic core means which defines said distal gap.

6. A composite head according to claim 1, wherein said optical fiber bundle is previously shaped to a predetermined configuration adapted for arrangement in said internal space of said holder.

7. A composite head according to claim 6, wherein said optical fiber bundle comprises a plurality of optical fibers each having a clad layer, and a coating material having a refractive index lower than that of said clad layer applied to the outer surface of each said optical fiber, said coating material being hardened so that said optical fiber bundle is shaped into said predetermined configuration.

8. A composite head according to claim 6, wherein said optical fiber bundle comprises a plurality of plastic optical fibers shaped into said predetermined configuration by heating.

9. A composite head according to claim 1, wherein said holder has an aperture through which said optical fiber bundle is drawn out.

10. A composite head according to claim 9, wherein said optical fiber bundle includes a first optical fiber bundle for incidence and a second optical fiber bundle for emission, and said holder has at least two apertures through which said first and second optical fiber bundles are passed.

11. A composite head according to claim 10, wherein said first and second optical fiber bundles have respective end faces, and further comprising a light emitting element and a light sensing element connected to said end faces of said first optical fiber bundle and said second optical on fiber bundle, respectively, said light emitting and sensing elements being embedded in said apertures through which said first and second optical fiber bundles are passed.

12. A composite head according to claim 1, wherein said side wall of said holder has, on the outer surface thereof, a guide groove communicating with said internal space and serving to guide said optical fiber bundle to the outside.

13. A composite head according to claim 1, wherein said holder is divided into two parts symmetrical with respect to a plane extending along said distal gap.

14. A composite head according to claim 1, wherein said holder has another end face on the opposite side thereof to said one end face, and said optical fiber bundle has another end which is fixed so that said another end of said optical fiber bundle is smoothed and exposed on said another end face of said holder.

15. A composite head according to claim 14, wherein said smoothed other end of said optical fiber bundle is a polished surface.

16. A composite head according to claim 14, wherein said smoothed other end of said optical fiber bundle is opposed and optically coupled to a light emitting element or a light sensing element retained by a second holder.

17. A composite head according to claim 16, wherein said another end face of said first holder has a cylindrical projection with a smooth surface, and a second holder has a hole adapted to receive said projection, said another end of said optical fiber bundle being exposed on said smooth surface of said projection, and said light emitting or sensing element being embedded in said hole.

* * * * *